United States Patent Office 3,299,105
Patented Jan. 17, 1967

3,299,105
4-HALOGEN-ANDROSTENES
Georg Anner and Peter Wieland, Basel, Switzerland, assignors to Ciba Corporation, New York, N.Y., a corporation of Delaware
No Drawing. Filed May 11, 1964, Ser. No. 366,632
Claims priority, application Switzerland, May 17, 1963, 6,278/63; Mar. 9, 1964, 2,992/64
4 Claims. (Cl. 260—397.4)

The present invention relates to the manufacture of new $\Delta^4$-3-oxo-4-halogen-androstenes of the formula

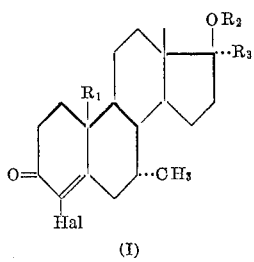

(I)

where $R_1$ stands for a hydrogen atom or a methyl group, Hal for a fluorine, chlorine or bromine atom, $R_2$ for a hydrogen atom, a lower hydrocarbon radical, the tetrahydropyranyl group or an acyl radical with 1 to 18 carbon atoms, and $R_3$ stands for a hydrogen atom or a lower aliphatic hydrocarbon radical.

The hydrocarbon radical $R_2$ may belong, for example, to the aliphatic, cycloaliphatic or araliphatic series, being more especially a lower alkyl, cycloalkyl or aralkyl radical, such as the methyl, ethyl, propyl, isopropyl, butyl, isobutyl, tertiary butyl, cyclopentyl, cyclohexyl or benzyl radical. The aliphatic hydrocarbon radical $R_3$ is primarily a lower alkyl radical, for example one of those mentioned above, or a lower alkenyl or alkinyl radical, such as the vinyl, allyl, methallyl, ethinyl or propargyl group.

An acyl radical is primarily that of an aliphatic, cycloaliphatic, araliphatic, aromatic or heterocyclic carboxylic acid or of an aliphatic or aromatic sulfonic acid, for example the radical of formic, acetic, propionic acid, a butyric acid, a valeric such as n-valeric acid, or of trimethylacetic acid, a caproic such as the $\beta$-trimethyl-propionic acid or diethylacetic acid, of oenanthic, caprylic, pelargonic, capric acid, an undecylic acid, for example undecylenic acid, of lauric, myristic, palmitic or stearic acids, for example of oleic acid, cyclopropyl-, -butyl-, -pentyl- and -hexyl-carboxylic acid, cyclopropyl-methyl carboxylic acid, cyclobutyl-methyl carboxylic, cyclopentyl-ethyl carboxylic, cyclohexyl-ethyl carboxylic acid, of cyclopentyl-, cyclohexyl- or phenyl-acetic or -propionic acids, of benzoic, phenoxyalkane acids such as phenoxyacetic acid, parachlorophenoxyacetic, 2:4-dichlorophenoxyacetic, 4-tertiary butylphenoxyacetic, 3-phenoxypropionic, 4-phenoxybutyric acid, furan-2-carboxylic, 5-tertiary butyl-furan-2-carboxylic, 5-bromo-furan-2-carboxylic acid, of the nicotinic acids, $\beta$-ketocarboxylic acids, for example acetoacetic, propionylacetic, butyrylacetic or caprinoylacetic acid, of aminoacids such as diethylaminoacetic, aspartic or of methanesulfonic, ethanesulfonic, benzenesulfonic or toluenesulfonic acid.

The new compounds possess valuable pharmacological properties; inter alia, they have a high anabolic action and a very favorable ratio of anabolic to androgenic action. More especially in this respect they are superior to the corresponding known compounds unsubstituted in position 7 or 4 respectively.

Of special value are those compounds of the Formula I where Hal stands for a chlorine or bromine atom, $R_2$ for a hydrogen atom or the acyl radical of a carboxylic acid with 1 to 18 carbon atoms, and $R_3$ represents more especially a methyl group, or a hydrogen atom, the ethyl, vinyl, allyl, ethinyl or propargyl radical, and $R_1$ has the above meaning and is above all a hydrogen atom.

Compounds of the Formula I where $R_2$ stands for the acyl radical of a carboxylic acid—preferably one that contains more than 2 carbon atoms—are particularly suitable for parenteral administration and when so used they display a prolonged action. On the other hand, compounds of the Formula I, where $R_2$ stands for a hydrogen atom and $R_3$ preferably for a methyl group, are advantageously administered perorally.

The new compounds can be manufactured by known methods; thus, for example, compounds of the Formula II may be epoxidized and the resulting 4:5-epoxides (III) split with a hydrohalide or a hydrohalide donor. This process is represented by the following scheme of partial formulae:

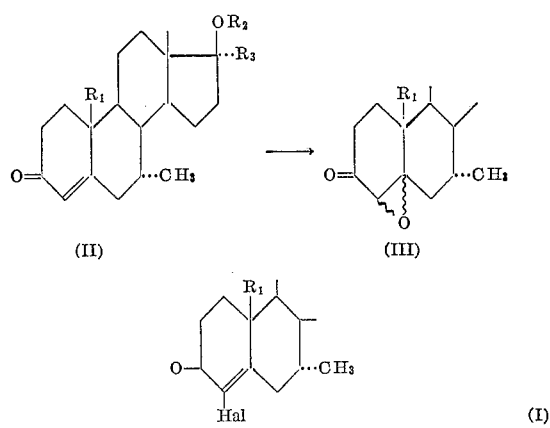

The aforementioned process may, for example, follow the method described in U.S. specification No. 2,933,510 granted December 21, 1955 to Percy L. Julian et al. and in British specification No. 864,615 granted April 6, 1961 to Societa Farmaceutici Italia. The epoxidation can be carried out, for example, with the aid of a peroxide, advantageously alkaline hydrogen peroxide, and the splitting of the epoxides by treatment with hydrogen halide, more especially hydrogen chloride or bromide, or a hydrohalide donor, for example a halide of a tertiary nitrogen base such as pyridine hydrochloride.

According to another process the above-mentioned starting materials of the Formula II can alternatively be halogenated directly, for example as shown in the following scheme of partial formulae:

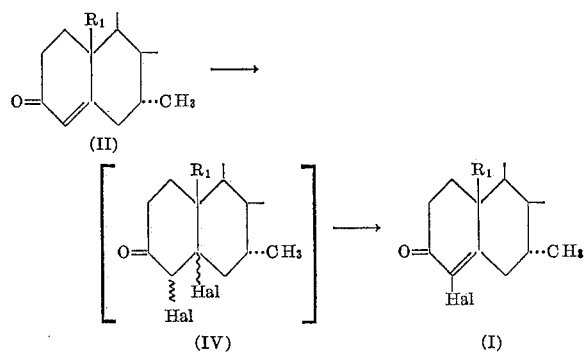

The reaction referred to above can be performed, for example, by the process described in Bull. Chem. Soc. Japan, 33, [1], page 25 [1960], and in Chem. Pharm.

Bull. Japan, 10 [5], page 429 [1962]. Suitable halogenating agents are, for example, free halogen or halogen donors, such as isocyanuric chloride, sulfuryl chloride or bromide, used in a neutral, acid or basic medium.

The new compounds are also accessible by halogenating the enol derivatives of compounds of the Formula II, more especially the enamines, followed by isomerisation of the resulting Δ⁵-4-halogeno compounds; this process is particularly suitable for the manufacture of 4-fluorandrostenes and takes, for example, the course represented by the following partial formulae:

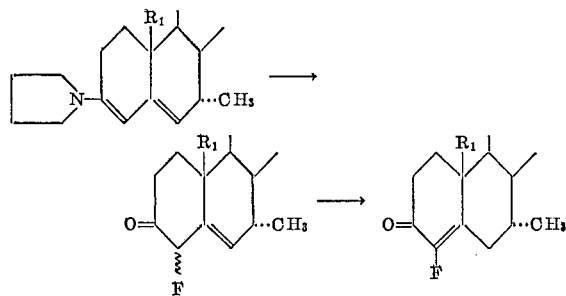

The halogenation is performed, for example, by treatment with perchloryl fluoride or a halogenating agent which acts in an equal manner, in a hydrous solvent, such as dimethylformamide, and advantageously in the presence of a tertiary nitrogen base, for example pyridine. The isomerisation is easy to perform by treating the reaction product with an acid, for example a mineral acid such as hydrochloric or sulfuric acid. Some variants of performing such reactions have been described, for example, in Belgian specification No. 601,533 published September 20, 1961 by Les Laboratoires Francais de Chimiotherapie, and in Bull. Soc. Chim. Fr., 1961, page 569 [3].

A 17β-hydroxyl group present in a compound obtained by the present process can be esterified or etherified in the usual manner.

The reactions of the invention are advantageously performed in the presence of a solvent or diluent, with cooling or preferably with heating, in the presence or absence of a catalyst, condensing agent and/or under an inert gas, if desired under superatmospheric pressure.

The invention includes also any modification of the present invention in which an intermediate obtained at any stage of the process is used as starting material and any remaining steps are carried out or the process is discontinued at any stage thereof, or in which the starting materials are formed under the reaction conditions.

Most of the starting materials are known. Those which are new can be manufactured by known methods. Thus, for example, the 4-unsubstituted Δ⁴-3-oxo-7α-methyl-androstenes and -19-norandrostenes of the Formula II are advantageously prepared from the 4:7-unsubstituted Δ⁵-3-hydroxy compounds by Oppenauer oxidation, dehydrogenation of the resulting Δ⁴-3-ketone to a Δ⁴·⁶-3-oxo-androstadiene (for example with chloranil) and reaction of the latter with methyl magnesium bromide in the presence of a cuprous salt. When the presence of an unsaturated hydrocarbon radical R₃, or of a free 17β-hydroxyl group in the reactant makes one of the aforementioned reactions impossible or disadvantageous, a corresponding compound containing an esterified or etherified 17β-hydroxyl group or a 17-oxoandrostane may be used as starting material. In the latter the hydrocarbon radical R₃ can be subsequently introduced in the known manner into the 17α-position of the reaction product. It is of advantage to manufacture starting materials that give rise to the final products designated above as especially valuable.

The new compounds are suitable for use as medicaments, for example in the form of pharmaceutical preparations that contain the new compounds in conjunction or admixture with a solid or liquid organic or inorganic pharmaceutical excipient suitable for enteral (for example oral), parenteral or local administration. Suitable excipients are substances that do not react with the new compounds, for example water, gelatin, lactose, starches, magnesium stearate, talcum, vegetable oils, benzyl alcohols, gums, polyalkylene glycols, white petroleum jelly, cholesterol or other known medicinal excipients. The pharmaceutical preparations may be in solid form, for example tablets, dragees or capsules, or in liquid or semi-liquid form as solutions, suspensions, emulsions, ointments or creams. These pharmaceutical preparations may be sterilized and/or contain assistants such as preserving, stabilizing, wetting or emulsifying agents, salts for regulating the osmotic pressure, or buffers. They may also contain further therapeutically valuable substances. The new compounds may also be used as starting materials for the manufacture of other valuable compounds.

The following examples illustrate the invention.

*Example 1*

A solution of 7.4 g. of 3-oxo-4β:5-epoxy-7α-methyl-17β-acetoxy-19-norandrostane and 30 g. of pyridine hydrochloride in 300 ml. of absolute chloroform is boiled for 23 hours, then cooled, washed three times with water, and the aqueous solutions are extracted twice with methylene chloride. The organic extracts are dried and evaporated under a water-jet vacuum; the residue is chromatographed on 200 g. of alumina (activity II). The fractions eluted with benzene yield after recrystallization from a mixture of methylene chloride, ether and pentane, 2.6 g. of 3-oxo-4-chloro-7α-methyl-17β-acetoxy-Δ⁴-19-norandrostene melting at 139.5–140.5° C. Infrared spectrum in methylene chloride: 5.78μ (acetate), 5.92+6.28μ (Δ⁴-3-ketone) and 8.08μ (acetate).

The 3-oxo-4β:5-epoxy-7α-methyl-17β-acetoxy-19-norandrostane used as starting material is prepared in the following manner:

36 ml. of hydrogen peroxide of 30% strength and 12 ml. of sodium hydroxide solution of 10% strength are simultaneously stirred dropwise into a solution, cooled at −2 to 0° C., of 6 g. of 3-oxo-7α-methyl-17β-hydroxy-Δ⁴-19-norandrostene in 60 ml. of methylene chloride and 180 ml. of methanol. The whole is kept for 90 hours at 0° C., then poured over ice and water, and agitated three times with benzene. The organic extracts are washed three times with water, dried and evaporated under a water-jet vacuum. Recrystallization of the residue from methylene chloride+ether yields 4.46 g. of 3-oxo-4β:5-epoxy-7α-methyl-17β-hydroxy-19-norandrostane melting at 137.5–138.5° C. On recrystallization from methylene chloride+ether the melting point rises to 139.5–140° C. Optical rotation $[\alpha]_D^{20} = +104°$ (c.=0.812 in chloroform). Infrared spectrum in methylene chloride: Bands at 2.77μ (hydroxyl) and 5.87μ (3-ketone).

A mixture of 6.33 g. of the resulting epoxide, 30 ml. of pyridine and 30 ml. of acetic anhydride is heated for 2½ hours at 40 to 45° C., whereupon the batch is evaporated under a high vacuum at the same temperature. The crystalline residue is dissolved in benzene and filtered through 30 g. of alumina (activity II). The filtrate is evaporated under a water-jet vacuum and the residue recrystallized from methylene chloride+ether+petroleum ether, to yield 6.49 g. of 3-oxo-4β:5-epoxy-7α-methyl-17β-acetoxy-19-norandrostane melting at 144–146.5° C. Optical rotation $[\alpha]_D^{20} = +95°$ (c.=0.928 in chloroform). Infrared spectrum in methylene chloride: Bands at 5.77μ (acetate), 5.84μ (ketone) and 8.09 (acetate).

*Example 2*

A solution of 3.32 g. of 3-oxo-4β:5-epoxy-7α:17α-dimethyl-17β-hydroxy-19-norandrostane and 13 g. of pyridine hydrochloride in 130 ml. of absolute chloroform is boiled for 20 hours, whereupon the solution is cooled and washed three times with water, and the aqueous solutions are extracted twice with methylene chloride. The organic solutions are dried and evaporated under a water-jet vacuum; the residue forms a faintly yellowish oil which reveals in the infrared spectrum the presence of a small proportion of saturated ketone apart from the bands typical of Δ⁴-3-oxo-4-chloro grouping. The pure 3-oxo-4-chloro - 7α:17α - dimethyl-17β-hydroxy-Δ⁴-19-norandrostene is obtained by dissolving the crude product in benzene and chromatographing the solution on 95 g. of alumina (activity II).

To prepare the 3-oxo-4β:5-epoxy-7α:17α-dimethyl-17β-hydroxy-19-norandrostane used as starting material, 24 ml. of hydrogen peroxide of 30% strength and 8 ml. of sodium hydroxide solution of 10% strength are simultaneously stirred dropwise into a solution, cooled at 0° C., of 4 g. of 3-oxo-7α:17α-dimethyl-17β-hydroxy-Δ⁴-19-norandrostene in 40 ml. of methylene chloride and 120 ml. of methanol. The batch is kept for 4 days at 0° C., then poured over ice-water and extracted 3 times with benzene. The organic extracts are washed 3 times with water, dried and evaporated under a water-jet vacuum. Recrystallization of the residue from an ether+pentane mixture yields 3.35 g. of 3 - oxo - 4β:5-epoxy-7α:17α-dimethyl-17β-hydroxy-19-norandrostane which after another recrystallization melts at 135–138° C. Optical rotation $$[\alpha]_D^{20} = +83°$$

(c.=1.119 in chloroform). Infrared spectrum in methylene chloride: bands at 2.76µ (hydroxyl) and 5.85µ (ketone).

*Example 3*

A solution of 380 mg. of 3-oxo-7α-methyl-17β-acetoxy-Δ⁴-19-norandrostene in 5 ml. of pyridine is treated with 1 ml. of a 2.43 N-solution of chlorine in glacial acetic acid while cooling with a mixture of ice and methanol. The reaction mixture is allowed to stand in the dark for 14 hours, then extracted with methylene chloride, and the extract washed with 1 N-hydrochloric acid and saturated sodium bicarbonate solution. The organic solutions are evaporated in a water-jet vacuum, and the residue chromatographed on 12 g. of alumina (activity II). With the first benzene fractions the 3-oxo-4-chloro-7α-methyl-17β-acetoxy-Δ⁴-19-norandrostene is eluted which is identical in every respect with the compound obtained according to Example 1.

What is claimed is:
1. A 4-halogen-androstene of the formula

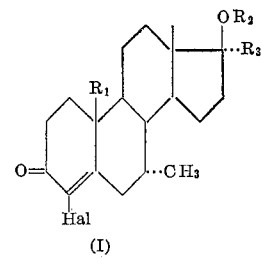

(I)

where $R_1$ stands for a member selected from the group consisting of a hydrogen atom and a methyl group, Hal for a member selected from the group consisting of a fluorine, chlorine and bromine atom, $R_2$ for a member selected from the group consisting of a hydrogen atom, lower alkyl, cyclo-lower alkyl, phenyl-lower alkyl, the tetrahydropyranyl group and an acyl radical with 1 to 18 carbon atoms, and $R_3$ stands for a member selected from the group consisting of a hydrogen atom, lower alkyl, lower alkenyl and lower alkinyl.

2. A compound of the Formula I shown in claim 1, wherein $R_1$ stands for a member selected from the group consisting of a hydrogen atom and a methyl group, Hal for a member selected from the group consisting of a chlorine and bromine atom, $R_2$ for a member selected from the group consisting of a hydrogen atom and the acyl radical of a carboxylic acid having 1–18 carbon atoms, and $R_3$ for a member selected from the group consisting of a hydrogen atom, the methyl, ethyl, vinyl, allyl, ethinyl and propargyl groups.

3. 3 - oxo - 4-chloro-7α-methyl-17β-acetoxy-Δ⁴-19-norandrostene.

4. 3 - oxo - 4-chloro-7α,17α-dimethyl-17β-hydroxy-Δ⁴-19-norandrostene.

References Cited by the Examiner
UNITED STATES PATENTS
3,074,932 1/1963 Schaub et al. _____ 260—239.5

OTHER REFERENCES
Applezweig, "Steroid Drug" (1962), McGraw-Hill, page 532.
Camerino et al., Journ. Amer. Chem. Soc. (1956), vol. 78, page 3540.
Campbell et al., "Steroids" 1 (1963), page 317.

LEWIS GOTTS, *Primary Examiner.*
ELBERT L. ROBERTS, *Examiner.*